March 4, 1969 A. I. STIEBEL ET AL 3,431,470
ELECTRONIC ALARM SYSTEM
Filed May 13, 1965
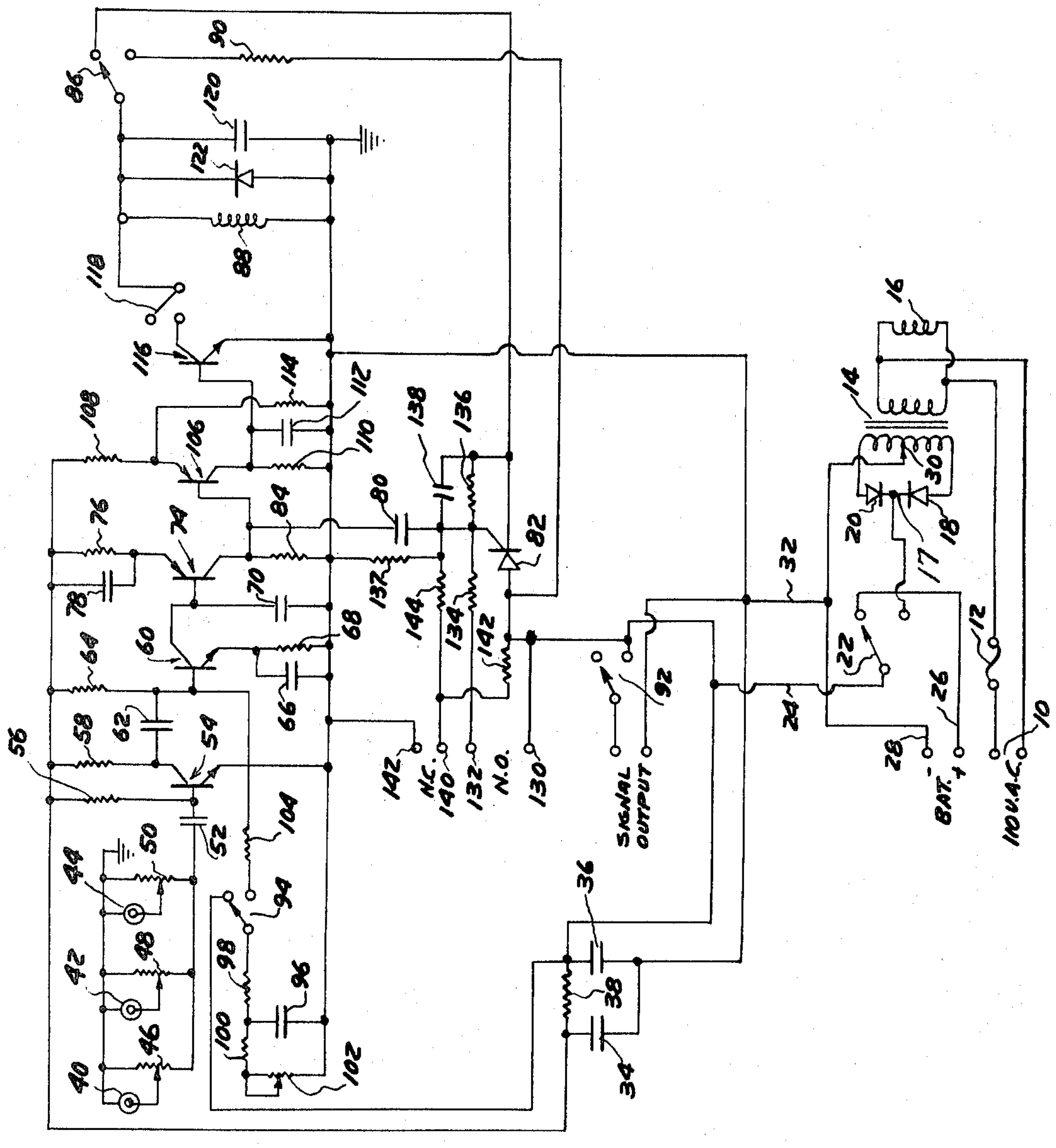
INVENTORS
ARIEL I. STIEBEL
SEYMOUR A. LIPPMANN
BY
ATTORNEY United States Patent Office 3,431,470
Patented Mar. 4, 1969

3,431,470
ELECTRONIC ALARM SYSTEM

Ariel I. Stiebel and Seymour A. Lippmann, Detroit, Mich., assignors to Federal Electronics, Inc., Wyandotte, Mich., a corporation of Michigan Filed May 13, 1965, Ser. No. 455,573
U.S. Cl. 317—142 2 Claims
Int. Cl. H01h 47/18, 47/32, 47/04

ABSTRACT OF THE DISCLOSURE

An alarm circuit providing an output signal for a predetermined length of time upon receipt of an input signal exceeding a threshold level, the input signal being supplied to an amplifier which triggers a solid state switch which in turn turns an alarm signal for a predetermined period of time.

This invention relates to an electronic alarm system operative to provide an output signal for a predetermined length of time after receipt of an input signal having a characteristic which exceeds a threshold value, from an alarm condition sensor and particularly to such a system which employs solid state elements joined in a unique configuration.

It has previously been proposed to employ alarm circuits which receive the input of one or more transducers operative to sense any of a variety of physical conditions such as an unusual noise level, vibrations, excessive temperature, the disturbance of doors and windows, etc., and to generate an electrical signal indicative of the condition. These signals are applied to the alarm circuit which, upon receipt of an input signal above a threshold level, becomes operative to provide an output signal for a predetermined length of time, independent of the duration of the input signal. The output may take a variety of forms such as an audible alarm, a flashing light, or any combination thereof. Such systems find use as burglar alarms, and the utility of providing an output alarm signal for a predetermined time after the receipt of a short danger input signal, is apparent.

The present invention falls into this class of alarm circuits and relies for its novelty on a unique combination of solid state sub-circuits which are arranged to perform the desired function in a highly reliable manner while employing both a minimum number of components and those whose cost is relatively low.

A preferred embodiment of the present invention, which will subsequently be disclosed in detail, makes provision for a plurality of inputs to a multi-stage audio amplifier so that it may receive signals from a number of transducers simultaneously. For example, the transducers may consist of microphones located at separated points in a building to be protected. All of the microphones simultaneously provide inputs to the first stage of the amplifier. One of the later stages of the amplifier is biased slightly into saturation so that a relatively large signal level, of a magnitude which would result from the introduction of a threshold level signal into the first ampifier stage, is required to drive it into conduction so as to provide a significant output. This technique minimizes the danger of false alarms resulting from the introduction of a small spurious signal into the earlier stages of the amplifier from some source such as capacitative or inductive pickup, as long as the same signal is not introduced at uncommonly large levels into these first stages of the amplifier.

The output of the audio amplifier actuates a solid state switch which in turn energizes a relay which locks in by its own contacts simultaneously. The relay switches a capacitor into a discharge-time delay circuit. The capacitor is maintained charged at a predetermined voltage level prior to the actuation of the relay. Upon switching it is removed from its source of voltage and discharges through a paralleled resistor. In the interim before discharging to a certain specified level, the condenser provides voltage and current into one of the later stages of the audio amplifier, so as to maintain the last stage of the amplifier in a conducting state. As long as the output stage of the audio amplifier conducts a subsequent current amplifier stage is biased to prevent the flow of base current into the next succeeding stage. This last stage is disconnected from the power supply prior to the actuation of the relay. The closure of the relay connects it to the power supply but as long as the stage just previous does not provide base current, as a result of the last stage of the audio amplifier being conducting because of the aforementioned energization from the charged capacitor, this output stage cannot fire.

When the time delay capacitor becomes discharged the flow of current from the audio amplifier stops thereby energizing the current amplifier and thus causing a power output stage to conduct. The output stage is connected directly across the coil of the relay which was energized when the solid state switch fired. When the power output transistor fires it bypasses a sufficient heavy current from the circuit that powers the relay so that the resistance in that circuit causes the voltage across the relay to fall to a low value. The relay therefore de-energizes and the circuit returns to its normal condition. During the time the relay is energized an output alarm signal is provided.

Auxiliary inputs are also provided to the circuit which will fire the sold state switch directly, without passing through the audio amplifier, upon the opening or closing of pairs of contacts. These contacts may represent on-off sensors such as a metallic window alarm tape. The power supply for the circuit is normally operated from a power line but a sensing relay switches the power source to a stand-by battery in the event that the power supply line fails.

It is therefore seen to be a primary object of the present invention to provide an alarm circuit of the type which provides an output signal for a predetermined length of time upon receipt of a signal that exceeds a threshold level wherein the input signal is supplied to an amplifier which triggers a solid state switch when a threshold input signal is received and initiates a series of functions leading to a predetermined time delay during which an alarm signal is generated.

Another object is to provide such a system wherein certain of the amplifier stages are employed to control the length of the time delay period.

Another object is to provide such a system wherein certain stages of the amplifier are biased into saturation so as to minimize the possibility of an output signal being triggered by a spurious signal.

Another object is to provide such a system wherein the energization of a relay marks the initiation of the time delay period and a solid state switch shunted across the relay coil is brought into a "ready" state upon the energization of the relay, and is triggered into conduction so as to terminate the time delay period upon the decay of voltage across a capacitor which capacitor was charged prior to the energization of the relay.

Other objects, advantages, and applications of the present invention will be made apparent by the following detailed description of a preferred embodiment to the invention. The description makes reference to the accompanying single figure of drawing which constitutes a schematic diagram of a preferred embodiment of the alarm circuitry.

Referring to the drawing, the circuit is normally powered from a 110 volt AC line 10 through the normal fuse 12. The line voltage is applied to the primary of a power transformer 14 and also across the coil of a relay 16. The end points of the secondary side of the transformer 14 are applied to a pair of diodes 18 and 20 which convert the AC into pulsating DC. Their mid-point 17 is applied to a set of contacts of switch 22 of the relay 16. The switch 22 constitutes a single-pole double-throw switch, normally closed, shown in its open position. In its normally closed position it connects the mid-point 17 of the diodes 18 and 20 to a line 24 which constitutes the positive side of the output of the power supply. In its open position switch 22 connects the line 24 to the positive terminal 26 of a battery. The negative terminal 28 of the battery is connected to the mid-point 30 of the secondary of the transformer 14 and to line 32 which constitutes the negative output of the power supply.

Thus, as long as line current is supplied to the transformer and to the coil of relay 16 the switch 22 provides pulsating DC to the balance of the system from the secondary of the transformer. However, when the line power is interrupted for some reason the contacts of switch 22 revert to their open state and power the balance of the system through the battery.

Lines 24 and 32 connect to a filter consisting of a pair of capacitors 34 and 36 and a resistor 38. This filter smoothes out the pulsating DC of the power supply for application to the circuit.

One of the two sets of inputs to the system is through the three jacks 40, 42 and 44. Each of the three jacks has one side connected to the ground (the negative terminal of the power supply) and the other end connected to the adjustable terminal of one of three potentiometers 46, 48 and 50, each of which has one of its end terminals connected to ground. The other ends of each of the three potentiometers 46, 48 and 50 are applied through a coupling capacitor 52 to the base of a transistor 54 which constitutes the first stage of audio amplification. The three potentiometers 46, 48 and 50 act as variable attenuators for their input signals. The input signals applied to the jacks 40, 42 and 44 are intended to be of a variable amplitude type as might be produced by a transducer generating an alternating current such as a microphone, or vibration pickup. The potentiometers adjust the threshhold levels at which the various inputs can actuate the alarm circuit.

The transistor 54 has its base forward biased by current flow through a resistor 56 and its collector receives current through a resistor 58. Its emitter is connected to ground and its collector is coupled to the base of the transistor 60 through a capacitor 62. Transistor 60 is also forward biased through a resistor 64. Its emitter is coupled to ground through the DC current limiting resistor 68 and the AC shunt capacitor 66. A capacitor 70 connects the collector to ground and shunts out any relatively high frequency pulses transmitted from the input circuit. Thus, the circuit is made insensitive to signals not pertinent to situations requiring the actuation of the alarm.

The collector of transistor 60 is directly connected to the base of a third transistor 74. Transistor 74 is biased into saturation by the collector current of transistor 60 and consequently by the current in resistor 64. The shunt combination of resistor 76 and capacitor 78 protects transistor 74 against excessive DC currents while allowing AC surge currents to flow. The output of the collector of transistor 74 is coupled through a capacitor 80 to the gate of a silicon controlled rectifier 82. The collector current of the transistor 74 produces a voltage output by flowing through a resistor 84.

As soon as the base of transistor 74 receives a sufficient input current to become highly conductive in its emitter circuit, the voltage across resistor 84 rises to a level sufficient to fire the silicon controlled rectifier 82. Capacitor 80 blocks DC currents from the gate of the silicon controlled rectifier 82 and permits only rapidly varying signals to initiate conduction. The silicon controlled rectifier 82 has its anode-cathode path connected between the power supply and the coil of a relay 88 through a single-pole doube-throw contact array 86 controlled by relay 88. The silicon controlled rectifier is normally maintained in a passive, non-conduction condition by the shunt combination of a resistor 136 and a capacitor 138 which connects to the anode of the silicon controlled rectifier. When the silicon controlled rectifier has fired, the relay coil 88 is energized and the contact array 86 switches and connects the relay to the positive side of the power supply through the current limiting resistor 90. This locks the relay in the energized state through its own contacts, in which condition it remains until it is released as will be subsequently described.

The relay 88 has another set of contacts 92, two of which form a normally open switch and which closes to provide a connection to the positive side of the power supply upon the energization of the coil 88. This contact closure acts as a signal output and may be used to energize an alarm bell or other suitable signaling device. The output contact remains connected to the positive side of the power supply as long as the relay 88 is energized.

The relay 88 has a third set of contacts 94 which consists of a single-pole double-throw switch type of contact array and is shown in its normally open position. In this position it connects to the positive side of the power supply and charges a capacitor 96 through a resistor 98. The capacitor 96 is shunted by a fixed resistor 100 and a variable resistor 102. Previous to the firing of the controlled rectifier 82 and the energization of the relay coil 88 the capacitor 96 is charged to line voltage. When the relay coil 88 is energized and the contacts 94 are closed the capacitor 96 is connected through a resistor 104 to the base of the transistor 60. Simultaneously the voltage across the capacitor 96 begins to discharge through the resistor combination 100 and 102 since the capacitor is no longer connected to the power supply.

The rate of decay of the voltage across the capacitor is an exponential function of the setting of the variable resistor 102. The base current of the transistor 60 also drains the charge off of the capacitor 96. The resistor 64 which connects the base of the transistor 60 to the positive side of the power supply is relatively large and is therefore a negligible path of conduction so that the transistor 60 receives its base current largely from the capacitor 96.

As long as the voltage of the capacitor 96 remains above a particular value, the transistor 60 remains in a conducting state and thereby also maintains the transistor 74 in a conducting state. This maintains a positive voltage at the junction of the resistor 84 and the collector of the transistor 74. The circuit constants are chosen so that only as long as transistor 74 conducts heavily this voltage is more positive than the emitter voltage of a fourth transistor 106 which has its base connected to the junction between the resistor 84 and the collector of the transistors 74. When this more positive condition prevails, transistor 106 is biased to cut off. The emitter voltage of transistor 106 is established by the voltage divider consisting of resistor 108 and resistor 114. The divider's operation is modified during conduction of transistor 106 by the emitter current. The shunt combination of a resistor 110 and a capacitor 112 which are connected to ground provide the loading impedance for transistor 106.

A fifth transistor 116 has its collector connected to one of another set of contacts 118 of the relay 88. Before the relay is energized these contacts disconnect the collector from the positive voltage supply. However, when the coil of the relay 88 is energized the contacts switch and, in connection with the contacts 86, connect the collector to the positive side of the power supply. As long as the transistor 106 conducts heavily the voltage at its collector prevents any appreciable base current in the forward biasing direction from flowing to the transistor 116. The transistor 116 is therefore maintained in a non-conducting state. However, as soon as the voltage across the capacitor 96 decays to a predetermined value the transistors 74 and 106 become sufficiently non-conducting so that the voltage across resistor 84 falls and there is a positive bias voltage between the base and emitter of transistor 106. Transistor 106 enters into the conducting state. Since its emitter and collector are shunted directly across the coil of the relay 88 it effectively shorts out the relay and causes it to open. During the short interval that the relay is closing a capacitor 120 provides sustaining current so that the relay remains energized when the moving contact of 86 is between the two fixed contacts. This prevents the coil from chattering as a result of the pulsating DC applied to its coil. The diode 122 shorts out induced pulses which occur when the relay de-energizes and protects the silicon controlled rectifier 82 and the transistor 116.

As soon as the transistor 116 fires opening the relay 88 the signal output is terminated and the unit returns to its initial state. The alarm circuit also has a pair of input terminals 130 and 132 which may be connected to an on-off type of signal source such as a weight detecting pad, which is normally in an open state and which closes a pair of contacts when a signal is transmitted. The closure of this contact provides positive voltage from the power supply through a resistor 134 to a gate of the controlled rectifier 82 causing the controlled rectifier to fire and begin the time delay mode. Otherwise, the gate is biased by a resistor 136 which is connected to the anode of the controlled rectifier by a capacitor 138 which shunts the resistor.

The circuit also has a pair of inputs 140 and 142 which are connected to some normally closed signal device. A line 140 connects to one resistor 144 which is connected to the gate of the controlled rectifier and to another resistor 146 which is connected to the positive side of the line. The contact 142 connects to the negative side of the line as long as a pair of contacts are closed across 140 and 142 no voltage is applied through resistor 144 to the gate of the controlled rectifier. However, when the contacts across lines 140 and 142 open positive voltage is supplied to the gate of the controlled rectifier 82, causing it to fire, and initiating the time delay mode. The device which may be disposed across the contact 140 and 142 may consist of some device such as a metallic window strip which breaks when the window is broken and thus opening a conductive path.

The arm circuit thus described is simple in construction and reliable in operation and utilizes highly reliable components, but accomplishes the functions with a minimum of components.

Having thus described our invention, we claim:

1. An electronic circuit operative to provide an output signal for a predetermined length of time upon the occurrence of a particular input signal, independently of the length of the duration of the input signal, comprising: an amplifier having a plurality of stages operative to receive the input signal; a relay having a coil; a first switching device adapted to be switched into a conducting state upon the receipt of a predetermined signal by the amplifier, said switching device being operative to energize said relay when conducting; a pair of relay contacts operative to lock said relay coil in an energized state at such time as said relay coil is energized by said switching device; and a time delay circuit operative to be energized upon actuation of the relay and to deenergize the relay upon the attaining of a predetermined time, and a second switching device is defined by a three element solid state device shunting said relay and energized into a conductive mode upon the termination of the predetermined time delay in order to deenergize the relay coil and open the locked-in relay contacts.

2. The circuit of claim 1 wherein the time delay circuit provides a voltage to one of the later stages of the amplifier in order to maintain the last stage of the amplifier conductive and the last stage of the amplifier connects to the three elements solid state device in order to maintain it nonconductive until the attaining of the predetermined time delay.

References Cited

UNITED STATES PATENTS 2,969,486 1/1961 Amfahr ------------ 317—148.5

LEE T. HIX, *Primary Examiner.*

U.S. Cl. X.R.

317—148.5, 154; 328—86